(12) United States Patent
Nelson et al.

(10) Patent No.: US 9,208,060 B1
(45) Date of Patent: Dec. 8, 2015

(54) EMULATION-BASED EXPRESSION EVALUATION FOR DIAGNOSTIC TOOLS

(71) Applicant: Microsoft Corporation, Redmond, WA (US)

(72) Inventors: Patrick L. Nelson, Redmond, WA (US); Gregory B. Miskelly, Seattle, WA (US); Jackson M. Davis, Carnation, WA (US); Eric H. Feiveson, Seattle, WA (US); Azeemullah Khan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/291,943

(22) Filed: May 30, 2014

(51) Int. Cl.
*G06F 9/45* (2006.01)
*G06F 11/36* (2006.01)

(52) U.S. Cl.
CPC .......... *G06F 11/362* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 5,836,014 A * | 11/1998 | Faiman, Jr. .................. | 717/156 |
| 5,901,315 A | 5/1999 | Edwards et al. | |
| 8,171,232 B2 | 5/2012 | Stall et al. | |
| 8,601,448 B2 | 12/2013 | Meijer et al. | |
| 2007/0022414 A1 * | 1/2007 | Bird .............................. | 717/143 |
| 2011/0239186 A1 | 9/2011 | Zinkovsky et al. | |
| 2013/0227530 A1 | 8/2013 | Zhang et al. | |
| 2014/0019948 A1 | 1/2014 | Goetz et al. | |

OTHER PUBLICATIONS

Ciabrini, et al., "Bugloo: A Source Level Debugger for Scheme Programs Compiled into JVM Bytecode", In Proceedings of the International Lisp Conference, Oct. 12, 2003, 12 pages.

Muller, et al., "Expression Tree Evaluation by Dynamic Code Generation—Are Accelerators up for the Task?", In Proceedings of 42nd International Conference on Parallel Processing, Oct. 1, 2013, pp. 230-239.

Hui, Soon, "Understanding Lambda Expression via Step by Step Debugging", Published on: Jul. 10, 2009 Available at: http://itscommonsensestupid.blogspot.In/2009/07/understanding-lambda-expression-via.html, 5 pages.

Marlow, et al., "A Lightweight Interactive Debugger for Haskell", In Proceedings of the ACM SIGPLAN Workshop on Haskell Workshop, Sep. 30, 2007, pp. 13-24.

(Continued)

*Primary Examiner* — Chuck Kendall
(74) *Attorney, Agent, or Firm* — Kevin Sullivan; Micky Minhas (57) ABSTRACT

Systems, methods and computer program products are described that enable a diagnostic tool, such as a debugger, to evaluate an expression based on the state of a target program process where the expression to be evaluated includes a call to a first function that exists in the target program process but where evaluation of such first function requires evaluation of a second function that does not exist in the target program process. For an expression such as this, the diagnostic tool emulates execution of the first function within a process other than the target program process, such as within the diagnostic tool process. In other embodiments, the emulation capability of the diagnostic tool is leveraged to enable a user thereof to simulate a modification of the target program process without making actual changes to the target program process.

20 Claims, 7 Drawing Sheets

(56) References Cited

OTHER PUBLICATIONS

International Search Report & Written Opinion Received for PCT Patent Application No. PCT/US2015/032335, Mail Date: Sep. 8, 2015, 10 Pages.

Porkola, Zoltan, "Functional Programming with C++ Template Metaprograms" Central European Functional Programming School, Lecture Notes in Computer Science, Series vol. 6299, May 21, 2009, pp. 306-353.

* cited by examiner

EMULATION-BASED EXPRESSION EVALUATION FOR DIAGNOSTIC TOOLS

BACKGROUND

Within the field of computing, diagnostic tools exist that enable a user thereof to identify problems that may be present in the software and/or hardware of a computer or network of computers. One non-limiting example of a diagnostic tool is a debugger. A debugger refers to a computer program that can be used to identify and correct problems or defects (i.e., "bugs") that may exist in another computer program (sometimes referred to as the "target program" or "debuggee"). A developer may use a debugger to execute a target program in a controlled fashion so that the developer can acquire knowledge about the target program as it executes. For example, the developer may utilize breakpoints or some other means provided by the debugger to pause the execution of the target program during controlled execution thereof. During the interruption, the developer may inspect the state of the target program to determine whether the target program is functioning as expected.

Some conventional debuggers offer a feature known as an expression evaluator. A developer can use an expression evaluator to determine the value of a particular expression based on a current state of a target program at one or more points during execution of the target program.

SUMMARY

Systems, methods and computer program products are described herein that enable a diagnostic tool, such as a debugger, to evaluate an expression based on the state of a target program process (e.g., a debuggee process) where the expression to be evaluated includes a call to a first function that exists in the target program process but where evaluation of such first function requires evaluation of a second function (e.g., a lambda expression) that does not exist in the target program process. For an expression such as this, the diagnostic tool emulates execution of the first function within a process other than the target program process, such as within the diagnostic tool process. By so doing, the diagnostic tool is capable of evaluating the expression based on the state of the target program process without having to execute the first function within the target program process (where the second function does not exist). The emulation capability of the diagnostic tool can also be leveraged to enable a user of the diagnostic tool to simulate modifications to the target program process without making actual changes thereto.

In particular, a method is described herein that is performed by a diagnostic tool process executing on a computer. In accordance with the method, an expression to be evaluated based on a state of a target program process is received. The expression includes a call to a first function that is included in the target program process, evaluation of the first function being dependent upon evaluation of a second function that is not included in the target program process. In further accordance with the method, the expression is evaluated. Evaluating the expression includes at least emulating the execution of the first function and the second function within a process other than the target program process. The process other than the target program process may be, for example and without limitation, the diagnostic tool process.

In one embodiment of the foregoing method, emulating the execution of the first function within the process other than the target program process includes obtaining from the target program process an intermediate language or machine language representation of the first function that is suitable for execution by an instance of a runtime system (e.g., the runtime system upon which the target program process is designed to be executed). This intermediate language or machine language representation of the first function is then provided to the instance of the runtime system for execution thereby. The runtime system may comprise, for example, a native runtime system or a virtual machine runtime system.

In another embodiment, emulating the execution of the second function within the process other than the target program process may further include compiling the second function to obtain an intermediate language or machine language representation thereof that is suitable for execution by an instance of the runtime system. This intermediate language or machine language representation of the second function is then provided to the instance of the runtime system for execution thereby.

In further accordance with this embodiment, the second function may comprise a lambda expression that does not exist within the target program process and emulating the execution of the second function within the process other than the target program process may further include generating a closure for any variables captured by the lambda expression. Alternatively, the second function may comprise a function template having an argument that specifies a generic specialization that does not exist within the target program process.

A system is also described herein. The system includes at least one processor and one or more memory devices connected to the at least one processor. The one or more memory devices store a software-based diagnostic tool for execution by the at least one processor. The diagnostic tool includes a user interface component and an expression evaluation component. The user interface component is operable to receive an expression to be evaluated based on a state of a target program process. The expression evaluation component includes decision logic and an emulator. The decision logic is operable to determine that the expression includes a first operation that is included in the target program process and that an evaluation of the first operation is dependent upon an evaluation of a second operation that is not included in the target program process. The emulator is operable to evaluate the first operation and the second operation by executing the first operation and the second operation in a process other than the target program process responsive to the determination by the decision logic. The process other than the target program process may be, for example and without limitation, a process comprising an executing instance of the diagnostic tool.

In an embodiment of the foregoing system, the emulator is operable to obtain from the target program process an intermediate language or machine language representation of the first operation that is suitable for execution by an instance of a runtime system (e.g., the runtime system upon which the target program process is designed to be executed). The emulator is further operable to provide the intermediate language or machine language representation of the first operation to the instance of the runtime system for execution thereby. The runtime system may comprise, for example, one of a native runtime system or a virtual machine runtime system.

In another embodiment, the emulator is operable to compile the second operation to obtain an intermediate language or machine language representation thereof that is suitable for execution by an instance of a runtime system. The emulator is further operable to provide the intermediate language or machine language representation of the second function to the instance of the runtime system for execution thereby.

In yet another embodiment, the second operation comprises a lambda expression and the emulator is further operable to generate a closure for any variables captured by the lambda expression. Alternatively, the second operation may comprise a function template having an argument that specifies a generic specialization that does not exist within the target program process.

A computer program product is also described herein. The computer program product includes a computer-readable memory having computer program logic recorded thereon that when executed by at least one processor causes the at least one processor to perform a method for virtually modifying a target program process being executed by a diagnostic program process. In accordance with the method, code copied from a target program associated with the target program process is modified. The code corresponds to a set of instructions located at a range of instruction addresses in the target program process. The modified code is compiled to generate compiled code. The target program process is executed. Execution of the target program process is stopped at a point immediately before the set of instructions located at the range of instruction addresses. The compiled code is then executed in a process other than the target program process. At least one side effect generated by executing the compiled code in the process other than the target program process is transferred to the target program process. Finally, execution of the target program process is resumed at a point immediately after the set of instructions located at the range of instruction addresses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As noted in the Background Section, some conventional diagnostic tools such as debuggers offer a feature known as an expression evaluator. A developer can use an expression evaluator to determine the value of a particular expression based on a current state of a target program at one or more points during execution of the target program. As used herein, the term "expression" refers to any combination of explicit values, constants, variables, operators, and/or functions that are interpreted according to the particular rules of precedence and association for a particular programming language. Evaluation refers to the process by which an expression is computed to return another value.

When evaluating an expression that has been input or otherwise specified by a developer, diagnostic tools such as debuggers typically parse the expression into a custom intermediate language that can then be evaluated by the debugger. The value of any variables included in the expression may be obtained from the current state of the target program. When functions are called as part of the expression, these functions are typically executed in the target program process by setting the context of a thread to the beginning of the function being evaluated and then allowing the target program process to continue. However, this approach poses a problem when attempting to evaluate an expression containing a function call that passes a new function that doesn't currently exist in the target program process as a parameter, such as a lambda expression. As will be appreciated by persons skilled in the relevant art(s), a lambda expression is made up of a function to do the work and a closure containing any variables captured by the lambda expression. The lambda expression does not exist within the target program process so it is not possible to evaluate the expression without modifying the target program process to contain it. Also, if variables are captured by value, they are typically lifted to the closure by the compiler. This is also not possible when evaluating an expression without rewriting the calling function or incurring the added complexity of attempting to track variables modified by the lambda expression and write them back after evaluation of the expression.

Systems, methods and computer program products are described herein that address these and other issues. In particular, systems, methods and computer program products are described herein that enable a diagnostic tool, such as a debugger, to evaluate an expression based on the state of a target program process (e.g., a debuggee process) where the expression to be evaluated includes a call to a first function that exists in the target program process but where evaluation of such first function requires evaluation of a second function (e.g., a lambda expression) that does not exist in the target program process. For an expression such as this, the diagnostic tool emulates execution of the first function and the second function within a process other than the target program process, such as within the diagnostic tool process. By so doing, the diagnostic tool is capable of evaluating the expression based on the state of the target program process without having to insert the second function within the target program process and without generating any undesired side effects within the target program process. As will also be described herein, the emulation capability of the diagnostic tool can also be leveraged to enable a user of the diagnostic tool to simulate modification of the target process without actually making real changes thereto.

Section II below describes example systems, methods and computer program products that use emulation to evaluate expressions based on a state of a target program process being analyzed by a diagnostic tool. Section III below describes example systems, method and computer program products that use emulation to simulate the modification of a target program process being analyzed by a diagnostic tool without actually modifying the target program process. Section IV describes an example computer system that may implement various features described herein. Section V provides some concluding remarks.

II. Emulation-Based Expression Evaluation

Figure 1:
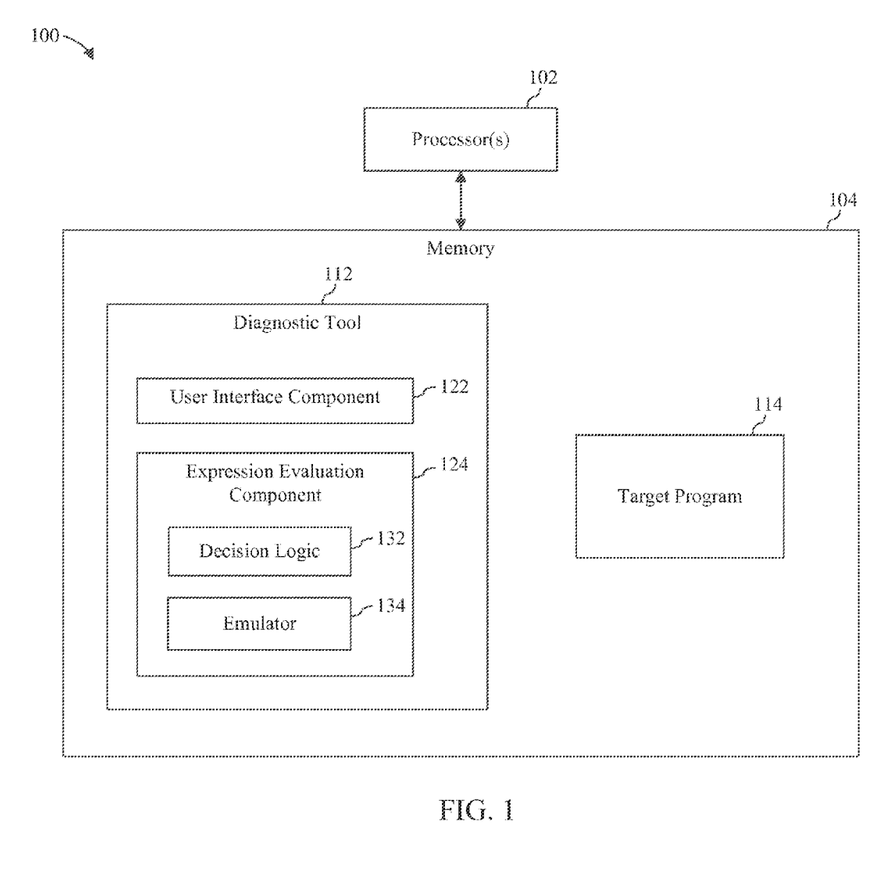
FIG. 1 is a block diagram of an example system that includes a diagnostic tool that supports emulation-based expression evaluation in accordance with an embodiment.

FIG. 1 is a block diagram of an example system 100 that includes a diagnostic tool 112 that supports emulation-based expression evaluation in accordance with an embodiment. System 100 includes one or more processors 102 and a memory 104 that is connected thereto. Processor(s) 102 represents one or more microprocessors or other circuits that are capable of executing software instructions that are stored in memory 104 and retrieved therefrom. Memory 104 is intended to represent one or more volatile and/or non-volatile memory devices that are capable of storing software instructions for execution by processor(s) 102. System 100 may be implemented, for example, in a desktop computer, laptop computer, tablet computer, netbook, server computer, or the like. In fact, system 100 may be implemented in any processor-based electronic device or system that is capable of executing software instructions. One example of a computer system that may be used to implement system 100 will be described in Section IV below.

As shown in FIG. 1, memory 104 stores both a diagnostic tool 112 and a target program 114, each of which may be executed by processor(s) 102. Diagnostic tool 112 comprises a debugger or other computer program that can be used to identify and correct problems or defects (i.e., "bugs") that may exist in another computer program, such as target program 114. A developer may use diagnostic tool 112 to execute target program 114 in a controlled fashion so that the developer can acquire knowledge about target program 114 as it executes. For example, the developer may utilize breakpoints or some other means provided by diagnostic tool 112 to pause the execution of target program 114 during controlled execution thereof. During the interruption, the developer may inspect the state of target program 114 to determine whether target program 114 is functioning as expected.

As further shown in FIG. 1, diagnostic tool 112 includes a user interface component 122 and an expression evaluation component 124. User interface component 122 represents logic that enables a user to interact with diagnostic tool 112 to invoke the functionality thereof. For example, user interface component 122 may comprise logic that generates a graphical user interface (GUI) via which a user can interact with diagnostic tool 112. Such GUI may be rendered to a display that comprises part of system 100 but that has not been shown in FIG. 1 for the sake of brevity.

Expression evaluation component 124 represents logic that operates to determine the value of an expression that has been input or otherwise specified by a user of diagnostic tool 112 (e.g., via a GUI generated by user interface component 122) based on a current state of a target program, such as target program 114, at one or more points during execution of the target program. Expression evaluation component 124 can be invoked by a user of diagnostic tool 112 at a point at which the controlled execution of the target program has been stopped (e.g., at a breakpoint). Generally speaking, expression evaluation component 124 operates to evaluate an expression entered or specified by a user based on the current state of the target program and to return one or more values to the user based on the evaluation.

Expression evaluation component 124 includes decision logic 132 and an emulator 134. Decision logic 132 operates to determine whether an expression to be evaluated should be evaluated with or without performing emulation. If decision logic 132 determines that an expression should be evaluated without performing emulation, then evaluation of the expression will be carried out in a manner that does not involve emulator 134. However, if decision logic 132 determines that an expression should be evaluated by performing emulation, then the evaluation of the expression will be carried out in a manner that involves emulator 134.

Figure 2:
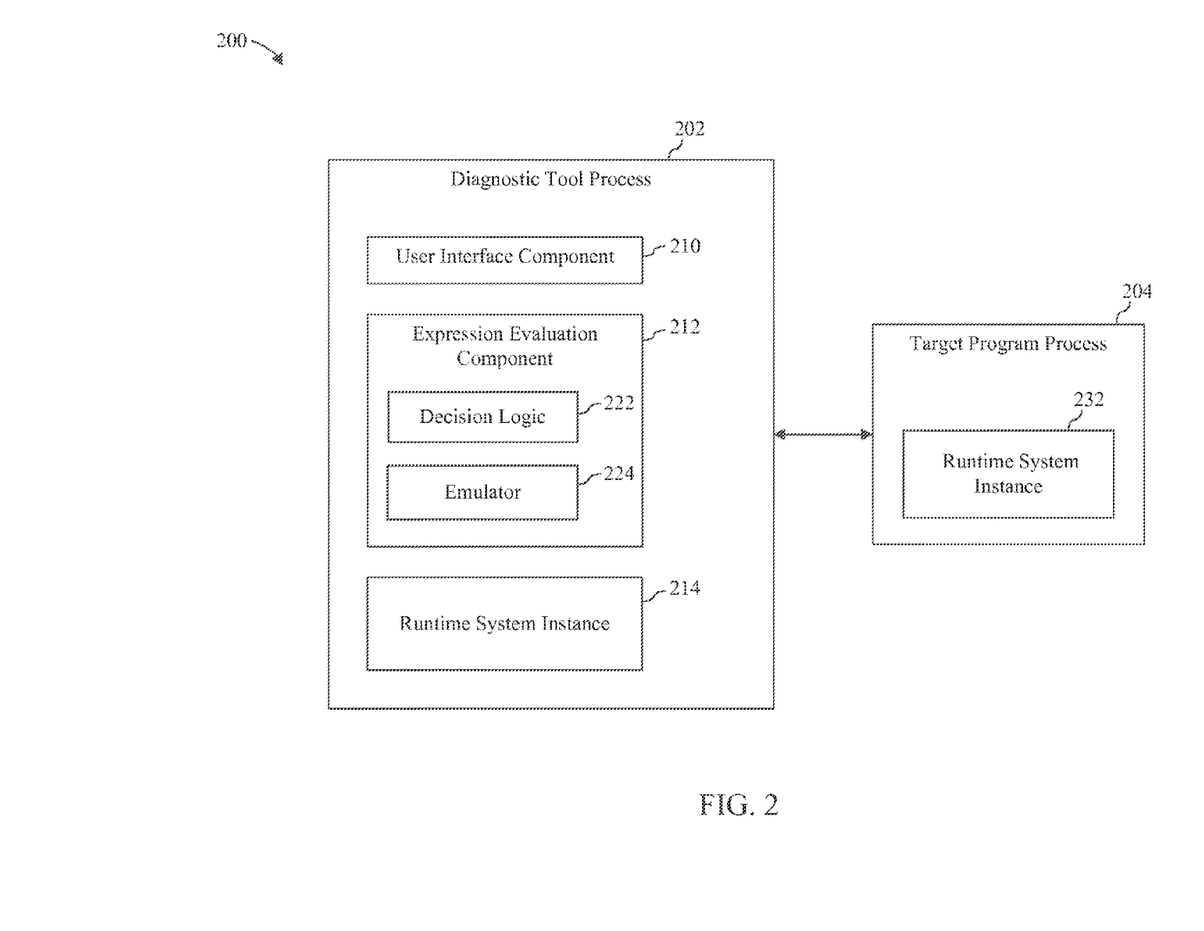
FIG. 2 is a block diagram showing an example diagnostic tool process that is executing a target program process in a controlled manner and that can use emulation to evaluate an expression based on a state of the target program process in accordance with an embodiment.

This functionality will be now be further described in reference to FIG. 2. In particular, FIG. 2 is a block diagram showing a system 200 that includes an executing instance of diagnostic tool 112, designated diagnostic tool process 202.

As further shown in FIG. 2, diagnostic tool process is executing an instance of target program 114, designated target program process 204, in a controlled manner so as to enable a user to observe the operation of target program process 204 for debugging purposes or some other purpose. Each of diagnostic tool process 202 and target program process 204 may be executing in memory (e.g., volatile memory) of system 100 as described above in reference to FIG. 1.

Each of diagnostic tool process 202 and target program process 204 include an image of the machine-executable code of diagnostic tool 112 and target program 114, respectively, as described above in reference to FIG. 1. Thus, diagnostic tool process 202 includes a user interface component 210 and an expression evaluation component 212 that respectively correspond to user interface component 122 and expression evaluation component 124 of diagnostic tool 112. Expression evaluation component 212 includes decision logic 222 and an emulator 224 that respectively correspond to decision logic 132 and emulator 134 of expression evaluation component 124. Diagnostic tool process 202 further includes an instance 214 of a runtime system upon which diagnostic tool 112 is designed to be executed. Runtime system instance 214 may comprise, for example and without limitation, an instance of a native runtime system or a virtual machine runtime system.

As also shown in FIG. 2, target program process 204 includes an instance 232 of a runtime system upon which target program 114 is designed to be executed. Runtime system instance 232 may comprise, for example and without limitation, an instance of a native runtime system or a virtual machine runtime system.

As used herein, the term "native runtime system" refers to a runtime system that may be employed when there is only partial code understanding functionality in the target program process. In such a system, code understanding is largely achieved by a code generation tool chain (compiler, linker, etc.) that is applied before the target program process is executed. In this case, the runtime system does not does not deal with an intermediate language representation of the code. Examples of native runtime systems include C/C++/assembly, ahead-of-time compilation for .NET/Java (.NET Native), etc.

As used herein, the term "virtual machine runtime system" refers to a runtime system that may be employed when the target program process has a fair amount of code understanding, so the underlying runtime system deals with some intermediate language representation of the program or possibly even the original source code. A virtual machine may Just-In-Time compile the intermediate language representation to native code. Examples of virtual machine runtime systems include standard .NET/Java, etc.

Runtime system instance 214 of diagnostic tool process 202 and runtime system instance 232 of target program process 204 may each be instances of the same runtime system or may be instances of different runtime systems. For example, in one embodiment, runtime system instance 214 and runtime system instance 232 are each instances of a Common Language Runtime (CLR) system. In another embodiment, runtime system instance 232 is an instance of a CLR system and runtime system instance 214 is an instance of a different runtime system that is capable of emulating a CLR system, such as a Common Intermediate Language (CIL) or Microsoft Intermediate Language (MSIL) interpreter.

During execution of diagnostic tool process 202, user interface component 210 may receive an expression that has been input or otherwise specified by a user and that is to be evaluated based on a current state of target program process 204. Such expression may be received, for example, while target program process 204 is in a paused state (e.g., at a breakpoint). Decision logic 222 of expression evaluation component 212 then determines whether the expression should be evaluated with or without performing emulation.

In one embodiment, decision logic 222 determines that the expression should be evaluated without performing emulation if decision logic 222 determines that the expression does not include any functions calls or if decision logic 222 determines that the expression includes one or more function calls but that all the functions that must be evaluated to resolve such function call(s) already exist within the target program process 204.

In one embodiment, if decision logic 222 determines that the expression should be evaluated without performing emulation then the evaluation may be carried out as follows. First, expression evaluation component 212 parses the expression into a custom intermediate language. This custom intermediate language representation may comprise, for example and without limitation, an abstract syntax tree representation. Then, expression evaluation component 212 steps through and evaluates each element in the custom intermediate language representation of the expression. If a variable is to be evaluated, then expression evaluation component 212 obtains the value of that particular variable from target program process 204. If a function call is to be evaluated, then expression evaluation component 212 causes the relevant function to be executed in target program process 204 by setting a context of a thread to the beginning of the function and then allowing target program process 204 to continue. Once each element of the custom intermediate language representation of the expression has been evaluated by expression evaluation component 212, then any value(s) generated by such evaluation are returned to the user.

Decision logic 222 may determine that the expression should be evaluated by performing emulation if decision logic 222 determines that the evaluation of the expression will involve evaluating at least one function that is not included in target program process 204. One example of such an expression is provided by the following Language-Integrated Query (LINQ) expression:

$$\text{MyDataSet.Where } (x\text{=>}x\text{>}a)$$

In this example, "MyDataSet" represents an array of integers that exists in target program process 204. The author of the expression would like to invoke the ".Where" function, which also exists in target program process 204, to return every integer value in "MyDataSet" that satisfies a particular constraint. To achieve this, the author of the expression has included a lambda expression as a parameter of the call to the ".Where" function that specifies the constraint. In particular, the lambda expression, "x=>x>a" will cause the ".Where" function to return every integer in MyDataSet that is greater than a value assigned to the variable "a."

As noted above, when performing expression evaluation without emulation, if a function call is to be interpreted, then expression evaluation component 212 causes the relevant function to be executed in target program process 204 by setting a context of a thread to the beginning of the function and then allowing target program process 204 to continue. This is problematic for the foregoing expression because although the ".Where" function exists in target program process 204, the lambda expression does not. Therefore it is not possible to evaluate the foregoing expression without modifying target program process 204 to include the lambda expression. Also, as was previously noted, a lambda expression is made up both of a function to do the work and a closure containing any variables captured by the lambda expression (in this case, the value of the variable "a"). Variables captured by value are customarily lifted to the closure by the compiler. This is also not possible when evaluating the foregoing expression without rewriting the calling function or incurring the added complexity of attempting to track variables modified by the lambda expression and write them back after evaluation of the expression.

Decision logic 222 overcomes these problems by recognizing that the evaluation of the foregoing example expression will involve evaluating at least one function that is not included in target program process 204—in this case, the lambda expression "x=>x>a"—and, based on this recognition, determining that the expression should be evaluated using emulation. The manner in which an expression is evaluated using emulation will now be described.

In the case of emulation, instead of expression evaluation component 212 parsing the expression to be evaluated into a custom intermediate language that can be interpreted, emulator 224 parses the expression to be evaluated into an intermediate language or machine language representation thereof that is suitable for execution by an instance of a runtime system. For example, emulator 224 may generate an intermediate language or machine language representation of the expression that is suitable for execution by an instance of the same runtime system upon which target program 114 was designed to be executed. However, this is only an example and other runtime system instances may be used for emulation.

To generate an intermediate language or machine language representation of a function that exists within target program process 204, emulator 224 obtains the intermediate language or machine language representation of the function from target program process 204. With continued reference to the foregoing example, since the ".Where" function already exists within target program process 204, emulator 224 obtains an intermediate language or machine language representation of that function from target program process 204. In an example in which runtime system instance 232 is an instance of the CLR system, emulator 224 may obtain a set of Common Intermediate Language (CIL) instructions from target program process 204 that represent the ".Where" function.

To generate an intermediate language or machine language representation of a function that does not exist within target program process 204, emulator 224 invokes a compiler (not shown in FIG. 2) to compile the function into the relevant intermediate language or machine language. With continued reference to the foregoing example, since the lambda expression ""x=>x>a" does not exist within target program process 204, emulator 224 invokes a compiler to generate an intermediate language or machine language representation of that function. For example, emulator 224 may invoke a compiler to generate a set of CIL instructions that represent the lambda expression "x=>x>a." Furthermore, in the case where the function that does not exist within target program 204 is a lambda expression, emulator 224 also generates a closure for any variables captured by the lambda expression.

Once an intermediate language or machine language representation of the expression has been obtained by emulator 224, emulator 224 then executes the expression by interpreting the intermediate language or machine language instructions, handing in values from the target program process 204 as needed and fetching or generating additional intermediate language or machine language instructions if another function is invoked. Such interpretation occurs in a process other than target program process 204 (e.g., within diagnostic tool process 202). Once the expression has been interpreted by emulator 224, one or more values generated as a result of the interpretation may be output to the user via user interface component 210.

It is noted that the foregoing emulation-based technique for expression evaluation is not limited to evaluating expressions that include lambda expressions, but can be used to evaluate any expression that includes at least one call to a function that is not included in the target program process. For example, the same emulation-based expression evaluation approach can be used to allow evaluation of expressions containing calls to function templates. If the template argument specifies a generic specialization that does not already exist in the target program process, then there is no way to resolve the function call by executing the function within the target program process. Instead, in accordance with the foregoing emulation-based technique, the template can be compiled with the new argument and the compiled template function can be executed in another process (e.g., the diagnostic tool process) by emulating the runtime system.

In the foregoing, it is described that an intermediate language or machine language representation of a function is obtained for the purposes of emulating the execution of such function. However, it is possible that emulation may be achieved by obtaining a source code representation of a function. This may be possible, for example, if a virtual machine being debugged has access to such source code representation. For example, a JavaScript virtual machine may have access to a source code representation of a function, since JavaScript does not have a standard intermediate language representation, and instead the actual program text is sent around.

In the foregoing it is suggested that the use of emulation may be premised upon the expression including a call to a first function that is included in the target program process, wherein evaluation of the first function is dependent upon evaluation of a second function that is not included in the target program process. However, it is noted that the emulation-based expression evaluation techniques described herein may also be applied in a case where the only function that needs to be evaluated is a function that does not exist in the target program process.

The foregoing emulation-based technique for expression evaluation is advantageous in that it enables a diagnostic tool to evaluate an expression based on the state of a target program process even when such expression includes a call to a function that does not exist within the target program process. Furthermore, the foregoing emulation-based technique for expression evaluation is advantageous in that it can evaluate such an expression in a manner that will not generate any undesired side effects within the target program process.

Figure 3:
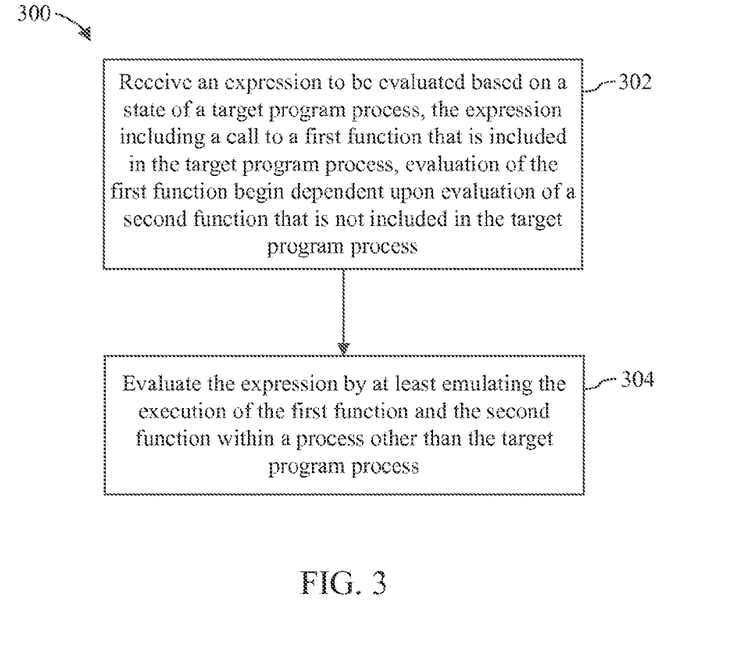
FIG. 3 depicts a flowchart of a method for performing emulation-based expression evaluation in accordance with an embodiment.

The foregoing emulation-based technique for expression evaluation will now be further described with reference to the flowcharts of FIGS. 3-8. For example, FIG. 3 depicts a flowchart 300 of a method for performing emulation-based expression evaluation in accordance with an embodiment. The method of flowchart 300 may be performed by a diagnostic tool process such as diagnostic tool process 202 of FIG. 2. However, the method is not limited to that embodiment.

As shown in FIG. 3, the method of flowchart 300 begins at step 302, in which an expression to be evaluated based on a state of a target program process is received. The expression includes a call to a first function that is included in the target program process, wherein evaluation of the first function being dependent upon evaluation of a second function that is not included in the target program process. This step may be performed, for example, by user interface component 210 of diagnostic tool process 202, which receives an expression to be evaluated based on the state of target program process 204.

By way of illustration, the expression received during step 302 may be the previously-described example expression "MyDataSet.Where (x=>x>a)". In this case, the call to the first function that is included in the target program process is the call to the ".Where" function, which is included in target program process 114 as mentioned above. As explained above, evaluation of the ".Where" function is dependent upon evaluation of the lambda expression "x=>x>a", which is not included target program process 144. Thus, in this example the lambda expression "x=>x>a" corresponds to the second function.

At step 304, the expression received during step 302 is evaluated by at least emulating the execution of the first function and the second function within a process other than the target program process. This step may be performed, for example, by emulator 224 of diagnostic tool process 202, which emulates the execution of the first function and the second function within a process other than target program process 204. The process other than target program process 204 may be, for example, diagnostic tool process 202 or some other process.

With continued reference to the example expression "MyDataSet.Where (x=>x>a)", in step 304, the expression is evaluated by at least emulating the execution of the ".Where" function and the lambda expression "x=>x>a" within a process other than the target program process, such as within diagnostic tool process 202.

Figure 4:
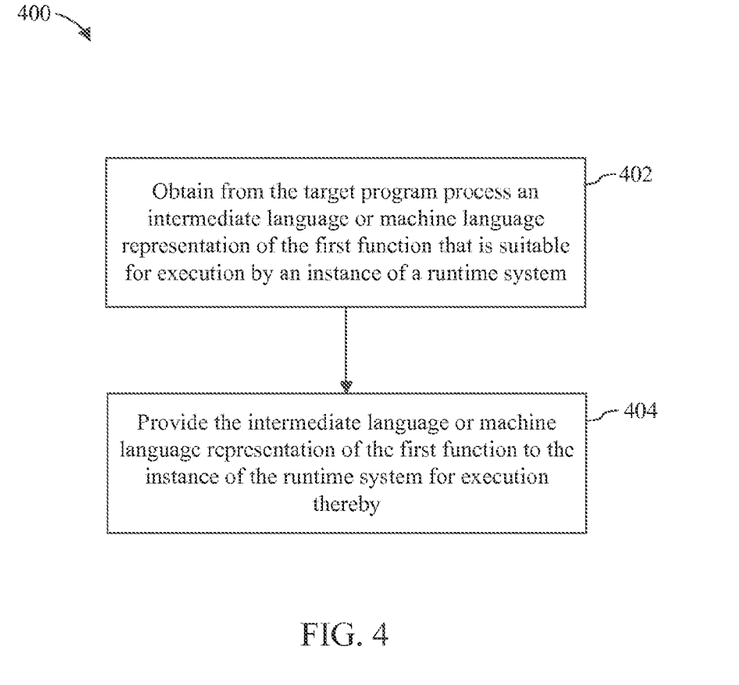
FIG. 4 depicts a flowchart of one method for emulating the execution of a function that is included in a target program process within a process other than the target program process in accordance with an embodiment.

FIG. 4 depicts a flowchart 400 of a method for performing step 304 of flowchart 300. That is to say, FIG. 4 depicts a flowchart 400 of steps that may be performed to emulate the execution of the first function that is included in the target program process within the process other than the target program process. The method of flowchart 400 may be performed by an emulator within a diagnostic tool process such as emulator 224 within diagnostic tool process 202 of FIG. 2. However, the method is not limited to that embodiment.

As shown in FIG. 4, the method of flowchart 400 begins at step 402, in which an intermediate language or machine language representation of the first function that is suitable for execution by an instance of a runtime system is obtained from the target program process. This step may be performed, for example, by emulator 224 of diagnostic tool process 202, which obtains from target program process 204 an intermediate language or machine language representation of the first function that is suitable for execution by an instance of a runtime system.

With continued reference to the example expression "MyDataSet.Where (x=>x>a)", in step 402, an intermediate language representation (e.g., a CIL representation) of the ".Where" function that is suitable for execution by an instance of a runtime system (e.g., by an instance of the CLR runtime system) is obtained from the target program process.

At step 404, the intermediate language or machine language representation of the first function is provided to the instance of the runtime system for execution thereby. This step may be performed, for example, by emulator 224 of diagnostic tool process 202, which provides the intermediate language or machine language representation of the first function to runtime system instance 214 or some other runtime system instance for execution thereby.

With continued reference to the example expression "MyDataSet.Where (x=>x>a)", in step 404, the intermediate language representation (e.g., the CIL representation) of the ".Where" function is provided to an instance of a runtime system (e.g., an instance of the CLR system) for execution thereby. This a different runtime system instance than the runtime system instance included in the target program process.

Figure 5:
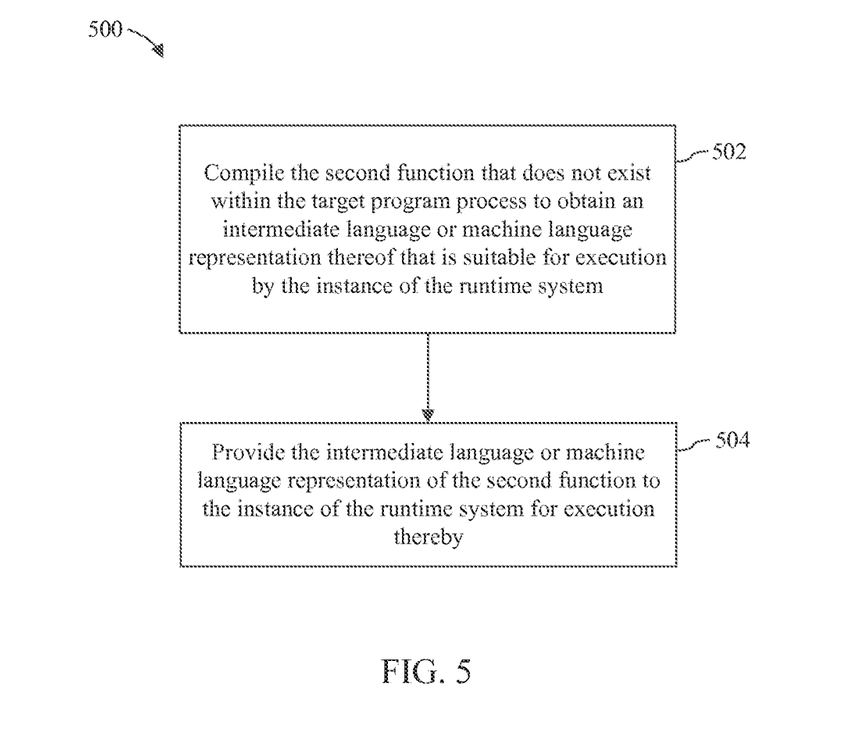
FIG. 5 depicts a flowchart of another method for emulating the execution of a function that is included in a target program process within a process other than the target program process in accordance with an embodiment.

FIG. 5 depicts a flowchart 500 of a further method for performing step 304 of flowchart 300. That is to say, FIG. 5 depicts a flowchart 500 of steps that may be performed to emulate the execution of the second function that is not included in the target program process within the process other than the target program process. The method of flowchart 500 may be performed by an emulator within a diagnostic tool process such as emulator 224 within diagnostic tool process 202 of FIG. 2. However, the method is not limited to that embodiment.

As shown in FIG. 5, the method of flowchart 500 begins at step 502, in which the second function is compiled to obtain an intermediate language representation thereof that is suitable for execution by an instance of a runtime system. This step may be performed, for example, by emulator 224 of diagnostic tool process 202, which invokes a compiler to compile the second function that does not exist within target program process 204 to obtain an intermediate language representation thereof that is suitable for execution by an instance of a runtime system.

With continued reference to the example expression "MyDataSet.Where (x=>x>a)", in step 502, the lambda expression "x=>x>a" is compiled to obtain an intermediate language representation (e.g., a CIL representation) of the lambda expression that is suitable for execution by an instance of a runtime system (e.g., a CLR system).

At step 504, the intermediate language or machine language representation of the second function is provided to the instance of the runtime system for execution thereby. This step may be performed, for example, by emulator 224 of diagnostic tool process 202, which provides the intermediate language or machine language representation of the second function to runtime system instance 214 or some other runtime system instance for execution thereby.

With continued reference to the example expression "MyDataSet.Where (x=>x>a)", in step 504, the intermediate language representation (e.g., the CIL representation) of the lambda expression "x=>x>a" is provided to an instance of a runtime system (e.g., an instance of the CLR system) for execution thereby. This a different runtime system instance than the runtime system instance included in the target program process.

Figure 6:
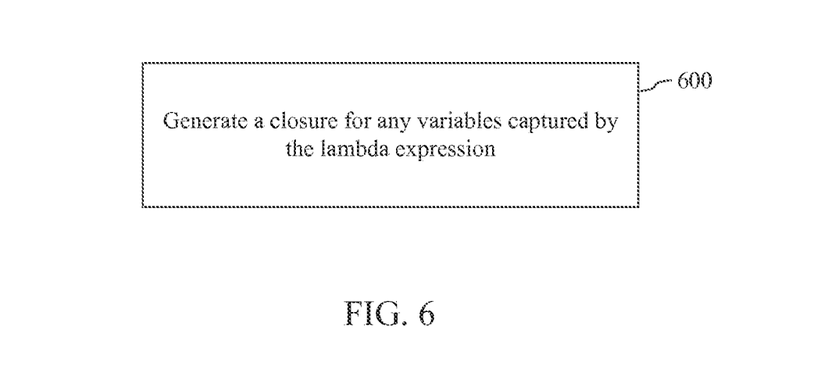
FIGS. 6 and 7 depict an additional steps that may be performed in emulating the execution of a function that is included in a target program process within a process other than the target program process in accordance with an embodiment.

FIG. 6 depicts an additional step 600 that may be performed in order to emulate the execution of a function within a process other than the target program process in accordance with an embodiment. This step may be performed, for example, by emulator 224 of diagnostic tool process 202. This step may be performed in addition to the steps of flowchart 500 when the second function referenced by that flowchart is a lambda expression. As shown in FIG. 6, step 600 comprises generating a closure for any variables captured by the lambda expression. With continued reference to the example expression "MyDataSet.Where (x=>x>a)", in step 600, a closure for the variable "a" is generated.

Figure 7:
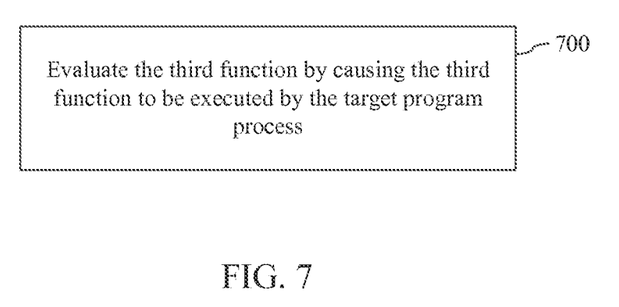

FIG. 7 depicts an additional step 700 that may be performed in order to emulate the execution of a function within a process other than the target program process in accordance with an embodiment. This step may be performed, for example, by emulator 224 of diagnostic tool process 202. This step is intended to show that although it may be determined that an expression should be evaluated using emulation as set forth above, emulator 224 may still determine that at least one function called by the expression should be evaluated by executing the function within the target program process. Here, this function is called "the third function" and, as shown in step 700, it is evaluated by causing it to be executed within the target program process. Thus, in an embodiment, a single expression may be evaluated by executing certain functions in the target program process and executing other functions in another process (e.g., a diagnostic tool process) by emulating a runtime system.

Figure 8:
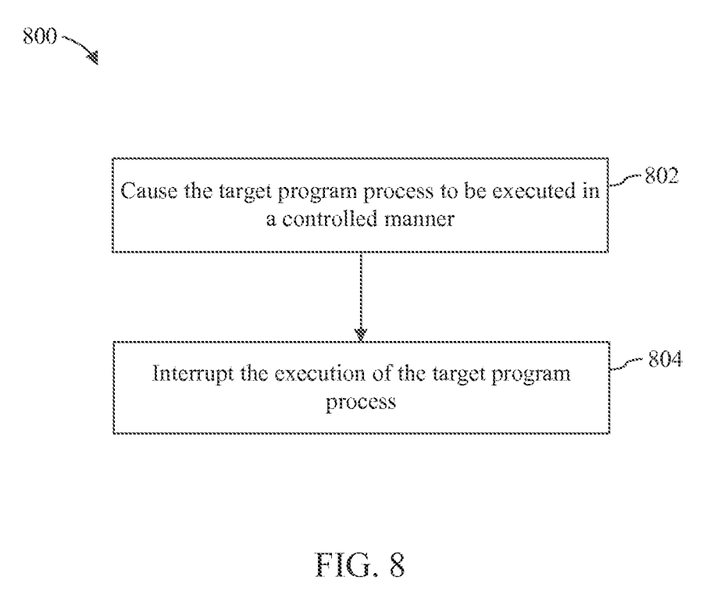
FIG. 8 depicts a flowchart of a method for generating a state of a target program process in accordance with an embodiment.

In all of the foregoing examples, an expression is sought to be evaluated based on the state of a target program process. FIG. 8 depicts a flowchart 800 of an exemplary method for generating the state of the target program process. The method of flowchart 800 may be performed by a diagnostic tool process such as diagnostic tool process 202 of FIG. 2. However, the method is not limited to that embodiment.

As shown in FIG. 8, the method of flowchart 800 begins at step 802 in which a target program process is caused to be executed in a controlled manner. This step may be performed, for example, by diagnostic tool process 202 which may cause target program process 204 to be executed in a controlled manner.

At step 804, the execution of the target program process is interrupted. This step may be performed, for example, by diagnostic tool process 202 which may interrupt the execution of target program process 204 based on a user-generated or automatically-generated breakpoint or pause, or based on some other factor or condition. Once the execution has been interrupted, the state of the target program process 204 may be analyzed by diagnostic tool process 202. For example, expression evaluation component 212 may be utilized to evaluate an expression based on the current state of target program process 204.

One benefit of the emulation-based expression evaluation expressions described herein is that such techniques may be used to evaluate expressions even in cases where an executing version of a target program process is not available. This is because such emulation-based expression evaluation techniques do not need to execute functions in the target program process to evaluate expressions that include calls to such functions. Consequently, these techniques can be used in scenarios in which the state of the target program is derived from a dump file, a memory snapshot, or other non-executable information associated with a target program.

III. Virtual Modification of Target Program Process Using Emulation

The previously-described emulation capability of diagnostic tool 112 can also be leveraged to enable a user of diagnostic tool 112 to simulate modification of a target process without actually making real changes thereto. This functionality will now be described in reference to FIG. 9.

Figure 9:
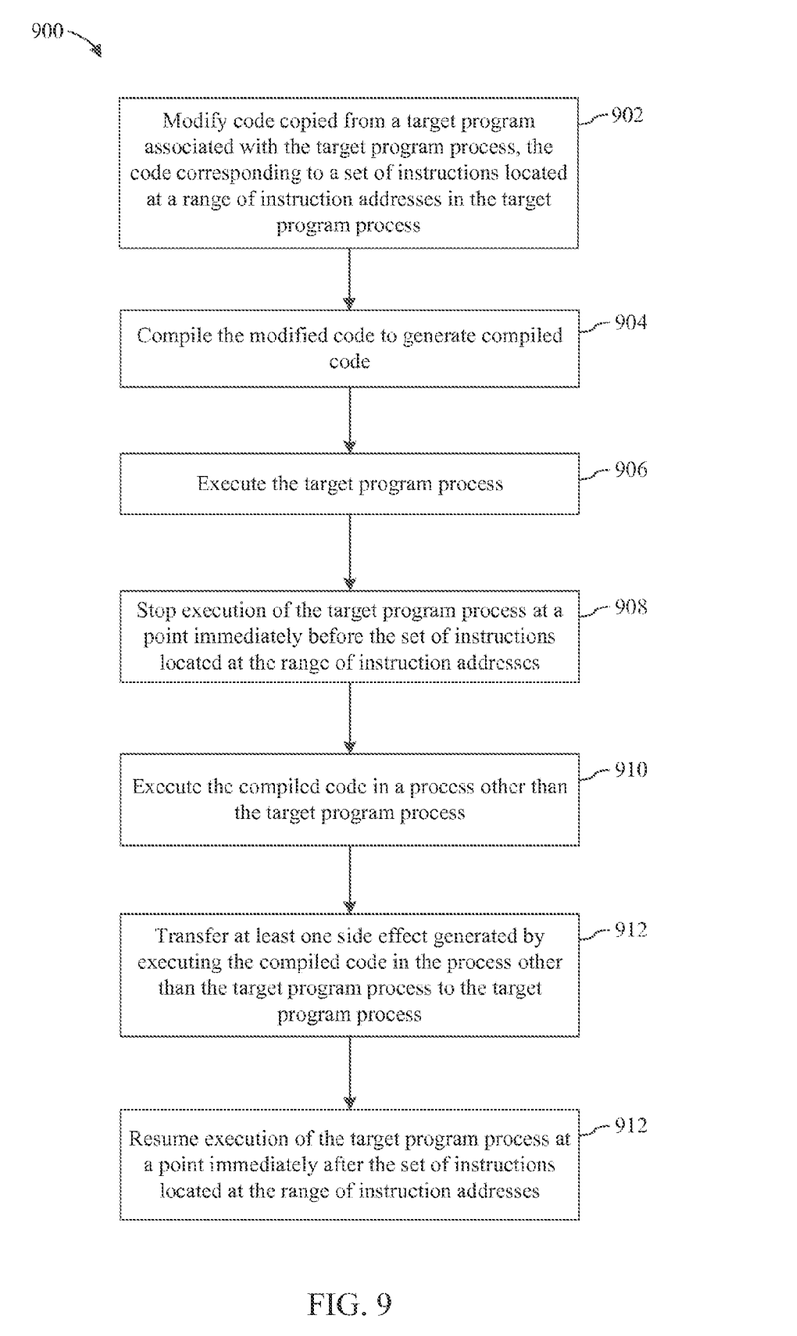
FIG. 9 depicts a flowchart of a method for virtually modifying a target program process being executed by a diagnostic program process.

In particular, FIG. 9 depicts a flowchart 900 of a method for virtually modifying a target program process being executed by a diagnostic program process. The method of flowchart 900 may be performed, for example, by diagnostic tool process 202 to make virtual changes to a target program process, such as target program process 204. However, the method is not limited to that embodiment.

As shown in FIG. 9, the method of flowchart 900 begins at step 902 in which code is copied from a target program associated with the target program process and then modified. The code corresponds to a set of instructions located at a range of instruction addresses in the target program process. Thus, for example, a user may interact with diagnostic tool process 202 or some other process to copy one or more lines of source code from a target program of which target program process 204 is an instance. The copied source code corresponds to a set of instructions located at a range of instruction addresses in target program process 204. The user then modifies the code.

At step 904, the modified code is compiled to generate compiled code. For example, the modified code may be compiled to obtain an intermediate language or machine language representation thereof that is suitable for execution by an instance of a runtime system. This step may be performed, for example, by diagnostic tool process 202.

At step 906, the target program process is executed. For example, diagnostic tool process 202 may cause controlled execution of target program process 204 to be initiated or resumed.

At step 908, execution of the target program process is stopped at a point immediately before the set of instructions located at the range of instruction addresses. This step may be performed by diagnostic tool process 202.

At step 910, the compiled code is executed in a process other than the target program process. This step may be performed, for example, by emulator 224 which causes the compiled code to be executed in diagnostic tool process 202 or some other process that is not target program process 204. Executing the compiled code may comprise providing the compiled code to an instance of a runtime system such as runtime system instance 214 or some other runtime system instance that is not part of target program process 204.

At step 912, at least one side effect generated by executing the compiled code in the process other than the target program process is transferred to the target program process. This step ensures that various state changes caused by emulating the execution of the compiled code are reflected in the target program process 204. This step may be performed, for example, by emulator 224 which transfers at least one side effect generated by executing the compiled code in the process other than target program process 204 is transferred to target program process 204.

At step 914, execution of the target program process is resumed at a point immediately after the set of instructions located at the range of instruction addresses. This step may be performed, for example, by diagnostic tool process 202 which cause execution of target program process 204 to be resumed at a point immediately after the set of instructions located at the range of instruction addresses.

IV. Example Computer System Implementation

Figure 10:
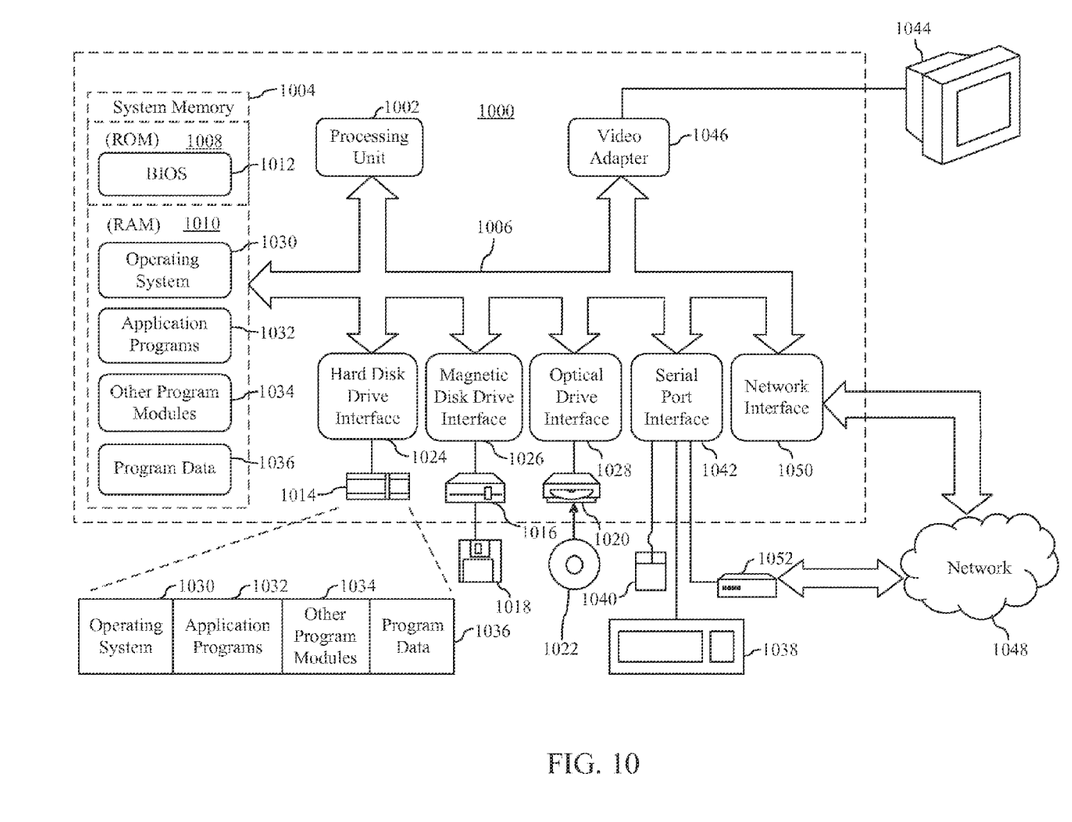
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement various components of system 100 as described above in reference to FIG. 1 or system 200 as described above in reference to FIG. 2. System 1000 may also be used to implement any or all of the steps of any or all of the flowcharts depicted in FIGS. 3-9. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of any of the components of system 100 described above in reference to FIG. 1 or any of the components of system 200 as described above in reference to FIG. 2. The program modules may also include computer program logic that, when executed by processing unit 1002, performs any of the steps or operations shown or described in reference to the flowcharts of FIGS. 3-9.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present invention discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method performed by a diagnostic tool process executing on a computer, the method comprising:
    receiving an expression to be evaluated based on a state of a target program process, the expression including a call to a first function that is included in the target program process, evaluation of the first function being dependent upon evaluation of a second function that is not included in the target program process; and evaluating the expression by at least emulating the execution of the first function and the second function within a process other than the target program process.

2. The method of claim 1, wherein emulating the execution of the first function and the second function within the process other than the target program process comprises emulating the execution of the first function and the second function within the diagnostic tool process.

3. The method of claim 1, wherein emulating the execution of the first function within the process other than the target program process comprises:

obtaining from the target program process an intermediate language or machine language representation of the first function that is suitable for execution by an instance of a runtime system; and providing the intermediate language or machine language representation of the first function to the instance of the runtime system for execution thereby.

4. The method of claim 1, wherein emulating the execution of the second function within the process other than the target program process comprises:

compiling the second function to obtain an intermediate language or machine language representation thereof that is suitable for execution by an instance of a runtime system; and providing the intermediate language or machine language representation of the second function to the instance of the runtime system for execution thereby.

5. The method of claim 4, wherein the second function comprises a lambda expression that does not exist within the target program process and wherein emulating the execution of the second function within the process other than the target program process further comprises:

generating a closure for any variables captured by the lambda expression.

6. The method of claim 4, wherein the second function comprises a function template having an argument that specifies a generic specialization that does not exist within the target program process.

7. The method of claim 4, wherein the runtime system comprises one of a native runtime system or a virtual machine runtime system.

8. A system, comprising:

at least one processor; and one or more memory devices connected to the at least one processor, the one or more memory devices storing a software-based diagnostic tool for execution by the at least one processor, the diagnostic tool comprising:

a user interface component operable to receive an expression to be evaluated based on a state of a target program process;

an expression evaluation component comprising:

decision logic operable to determine that the expression includes a first operation that is included in the target program process and that an evaluation of the first operation is dependent upon an evaluation of a second operation that is not included in the target program process;

an emulator operable to evaluate the first operation and the second operation by executing the first operation and the second operation in a process other than the target program process responsive to the determination by the decision logic.

9. The system of claim 8, wherein the emulator is operable to execute the first operation and the second operation in a process comprising an executing instance of the diagnostic tool.

10. The system of claim 8, wherein the emulator is operable to obtain from the target program process an intermediate language or machine language representation of the first operation that is suitable for execution by an instance of a runtime system and to provide the intermediate language or machine language representation of the first operation to the instance of the runtime system for execution thereby.

11. The system of claim 8, wherein the emulator is operable to compile the second operation to obtain an intermediate language or machine language representation thereof that is suitable for execution by an instance of a runtime system and to provide the intermediate language or machine language representation of the second function to the instance of the runtime system for execution thereby.

12. The system of claim 8, wherein the second operation comprises a lambda expression and wherein the emulator is further operable to generate a closure for any variables captured by the lambda expression.

13. The system of claim 8, wherein the second operation comprises a function template having an argument that specifies a generic specialization that does not exist within the target program process.

14. The system of claim 8, wherein the evaluation of the first operation is also dependent upon an evaluation of a third operation that is included in the target program process, and wherein the emulator is operable to evaluate the third operation by causing the third operation to be executed by the target program process.

15. The system of claim 11, wherein the runtime system comprises one of a native runtime system or a virtual machine runtime system.

16. The system of claim 8, wherein the state of the target program process upon which evaluation of the expression is to be based is obtained by causing the target program process to be executed in a controlled manner and then interrupting the execution of the target program process.

17. The system of claim 8, wherein the state of the target program process is derived from a dump file or a memory snapshot.

18. A computer program product comprising a computer-readable memory having computer program logic recorded thereon that when executed by at least one processor causes the at least one processor to perform a method for virtually modifying a target program process being executed by a diagnostic program process, the method comprising:

modifying code copied from a target program associated with the target program process, the code corresponding to a set of instructions located at a range of instruction addresses in the target program process;

compiling the modified code to generate compiled code;

executing the target program process;

stopping execution of the target program process at a point immediately before the set of instructions located at the range of instruction addresses;

executing the compiled code in a process other than the target program process;

transferring at least one side effect generated by executing the compiled code in the process other than the target program process to the target program process; and resuming execution of the target program process at a point immediately after the set of instructions located at the range of instruction addresses.

19. The computer program product of claim 18, wherein executing the compiled code in a process other than the target process comprises executing the compiled code in the diagnostic program process.

20. The computer program product of claim 18, wherein compiling the modified code to generate compiled code comprises compiling the modified code to obtain an intermediate language or machine language representation thereof that is suitable for execution by an instance of a runtime system.

* * * * *